United States Patent [19]

Sirevicius

[11] 3,860,383

[45] Jan. 14, 1975

[54] SHEET EXTRUSION DIE OPENING RESTRICTION DEVICE

[75] Inventor: Paul Sirevicius, Chicago, Ill.

[73] Assignee: Philips Petroleum Company, Battlesville, Okla.

[22] Filed: Jan. 11, 1973

[21] Appl. No.: 322,694

[52] U.S. Cl. ............... 425/461, 425/817 C, 264/51
[51] Int. Cl. ............................................. B29f 3/04
[58] Field of Search ........... 425/113, 131, 376, 461, 425/4 C, 817 C; 264/51

[56] References Cited
UNITED STATES PATENTS

| | | | |
|---|---|---|---|
| 2,572,677 | 10/1951 | Tench | 425/461 |
| 3,606,636 | 9/1971 | Glass et al. | 425/131 |
| 3,684,422 | 8/1972 | Huesing | 425/461 X |
| 3,751,209 | 8/1973 | Schreiber | 425/461 |

FOREIGN PATENTS OR APPLICATIONS 291,940   7/1965   Netherlands.......................... 264/51

*Primary Examiner*—R. Spencer Annear

[57] ABSTRACT

A device and method are provided for restricting the flow from a sheet extrusion die opening so that extruded sheet material is allowed to expand laterally while passing through the restriction device. In one embodiment of the invention, the restriction device is provided with a slotted opening of a configuration which gives the lateral edges of the extruded material a shape dissimilar to the extrudate sheet issuing from the die lips.

3 Claims, 9 Drawing Figures

SHEET EXTRUSION DIE OPENING RESTRICTION DEVICE

BACKGROUND OF THE INVENTION

This invention relates to the extrusion of plastic materials. In one of its aspects, this invention relates to the regulation of the shape of the extrudates issuing from extrusion dies. In another of its aspects, this invention relates more specifically to regulation of the lateral edges of extrudate issuing from sheet and film extrusion dies. In yet another of its aspects, this invention relates to extrusion of sheets of foamed plastic. In still another of its aspects, this invention relates to extrusion coating of a substrate.

In one of its concepts, this invention relates to regulating the uniformity of extruded sheet material by controlled restriction of lateral expansion of the extrudate.

In the extrusion of flat sheets of plastic material a great variety of widths of extrudate are manufactured. Since it would be too costly to purchase an extrusion die for each width required, the industry practice has been to purchase one die and to adjust the die gap length of the die to the width required. This is done by decreasing the width of the extrusion die with a plate, or deckle bar. The extrudate passing through the extrusion opening forms a flat sheet which will upon cooling shrink laterally causing nonuniformity in thickness, texture, and color particularly at the edges of the extruded sheet. Because of this nonuniformity at the lateral edges, it is sometimes necessary to trim a considerable amount of material from the extruded sheets to obtain a uniform product. This is particularly true if a foamed product is being produced.

I have discovered method and apparatus by which sheet material can be extruded having lateral edges of such uniformity that the necessity to trim the edges is minimized. I have also found that my method and apparatus are applicable for producing a sheet material with an edge having a different configuration than the flat sheet portion of the extrudate.

It is therefore an object of this invention to provide a method and apparatus for restricting the flow from a sheet extrusion die. It is another object of this invention to provide a method and apparatus for producing an extruded sheet material having lateral edges dissimilar in shape to the sheet extrudate. It is another object of this invention to provide method and apparatus whereby the necessity for trimming the lateral edges of the extrudate because of nonuniformity of the extrudate is minimized.

Other aspects, objects as well as the several advantages of this invention will be apparent to those skilled in the art upon reading the specification, the drawing, and the appended claims.

SUMMARY OF THE INVENTION

According to this invention, there is provided a method and apparatus for restricting the die opening of a sheet extrusion die with a restriction plate having a slotted opening aligned with the extrusion slot of the die and of dimensions sufficient to allow increasing lateral measurement of extrudate as the extrudate moves through the restriction plate from the extrusion slot of the die. In various embodiments, the restriction plate can be a slotted end cap attached to the lateral surface of an extrusion die, a slotted spacer plate attached to the lateral end of an extrusion die and held in place by an end cap, or a deckle bar having an extrusion opening shaped to allow lateral expansion of the extrudate passing therethrough.

In one embodiment of the invention, the slotted opening in the restriction plate can have a configuration which gives the extrudate lateral edge a shape dissimilar to the extrudate sheet issuing from the die lips. Among others, the lateral edge of the extrudate can be shaped by the restriction plate to taper from the die slot width of the extrusion die to a feathered edge; to taper outwardly from the die slot to form a thicker edge; to take a circular configuration; to take a tear drop configuration; to form a slight off-set from the die slot to put a "dog's leg" at the edge of the sheet or, to narrow immediately adjacent the die slot and taper outwardly therefrom to form a line of weakness for subsequent removal of the edge portion.

It will be readily apparent that this restriction plate is particularly useful in the extrusion of foamed thermoplastic sheet material. In this use, the foaming extrudate is allowed to expand laterally as it passes through the restriction plate slotted opening. This stabilizes and improves the edge quality of the foamed sheet and also improves color continuity from the main body of the sheet through the edge. This is particularly important where it is desired to impart a specific edge configuration to the sheet. A single sheet extrusion die can be adapted by the use of these restriction plates to produce a variety of widths of extruded sheet material.

The most advantageous aspect of using the restriction plates of this invention is the production of sheet material of such uniformity that a minimum amount of extrudate is lost through the necessity of trimming the edges of the sheet. No matter what lateral dimension is chosen as desired for the sheet material the use of these restriction plates will, as shown hereinafter, result in the production of a sheet necessitating less loss of material from trimming.

DESCRIPTION OF THE DRAWING

Referring now to FIGS. 1 and 2, the apparatus and process disclosed herein can be illustrated with a coat hanger type die in which the die block is made up of two molded pieces 1 and 2 molded in such configuration that when they are placed together an inlet port 3 is formed through which molten thermoplastic can enter a distribution channel 4 to be fed into the extrusion slot 5 which defines the thickness of the extruded material. Usually, the lateral dimension of the extrudate is defined by end plates 6 and 7 which are solid and confine the extruding material along a straight line of lateral dimension throughout essentially the entire extrusion slot. Upon delivery from the extrusion slot, the extrudate, as it cools, tends to contract laterally or "neck in". This is illustrated by the dashed lines 8 and 9 in FIG. 1.

Figure 1:
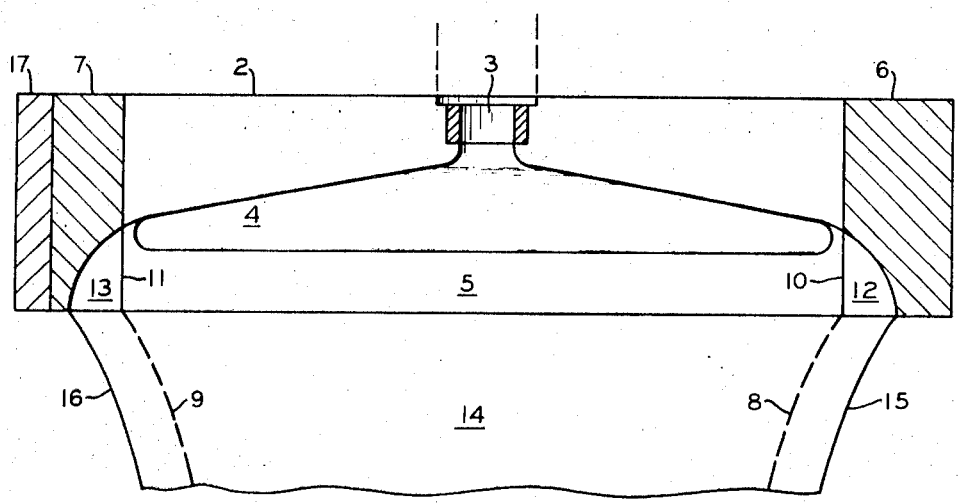
FIG. 1 shows a top view with cutaway of a coat hanger type die having end plates slotted to allow lateral expansion of material being extruded.

In my improved apparatus, the straight confining edge 10 and 11 at either side of the die extrusion slot 5 is replaced by an extrusion slot 12 and 13 in the end plates 6 and 7 with the slotted opening 12 and 13 aligned with the extrusion slot 5 of the die and of such dimension that the extrudate can expand laterally as it moves through the die. This produces from the same die a flat sheet 14 having a greater width, even after "neck in," than could be produced without the expansion slot. The lateral edges of extrudate 14 are illustrated as lines 15 and 16 in FIG. 1.

It has been found that by allowing the thermoplastic material to expand laterally, particularly when using a foamed extrudate, the extruded sheet contains usable material having a lateral dimension that exceeds the usable lateral dimension of material produced without using slotted expansion plates not by just the increment of expansion allowed; but, because the lateral expansion permits greater uniformity across the lateral dimension of the extrudate, the increment of usable material is greater than the increment of lateral expansion. In other words, as illustrated in FIG. 1, if the material in extrudate sheet 14 produced with a die with solid end caps having lateral edges 8 and 9 resulted in an unusable portion of a width equal to the distance between lines 9 and 16 or lines 8 and 15 it would be expected that using an expansion slot to produce an extrudate increased in total lateral dimension by the sum of the distances between lines 9 and 16 and 8 and 15 would produce a usable portion laterally increased by the same amount. In actuality, the usable portion is increased by more than the sum of the distances between line 9 and 16 and 8 and 15, so that the usable portion would have a lateral dimension greater than the distance between lines 8 and 9.

Figure 2:
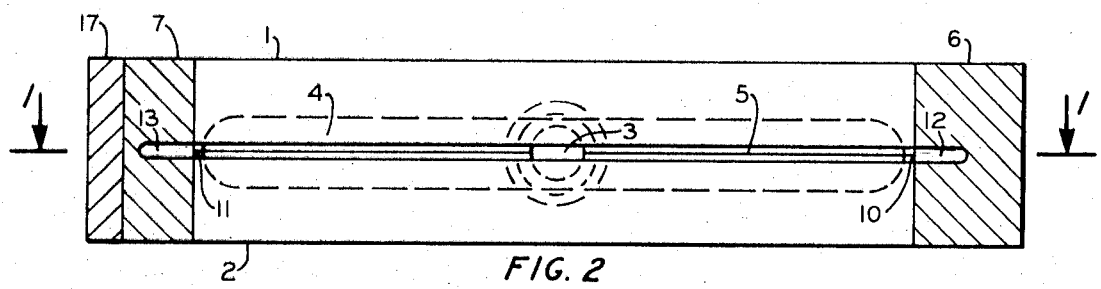
FIG. 2 is a front view of the extruder of FIG. 1.

Also illustrated in FIGS. 1 and 2 are embodiments showing an end plate 6 having a slotted opening 12 which can be compared with the embodiments showing a spacer 7 having a slotted opening 13 with the spacer retained against the die by end cap 17.

Figure 3:
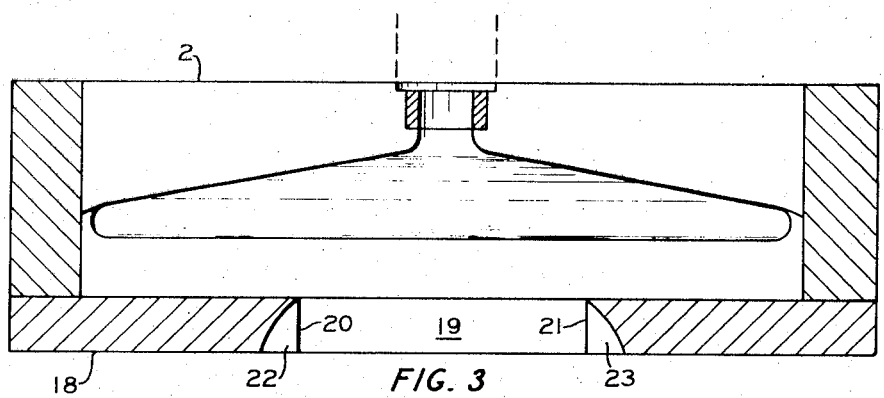
FIG. 3 is a top view shown in cutaway of a coat hanger type extruder having a deckle bar with an extrusion slot which allows lateral expansion of the extrudate.
Figure 4:
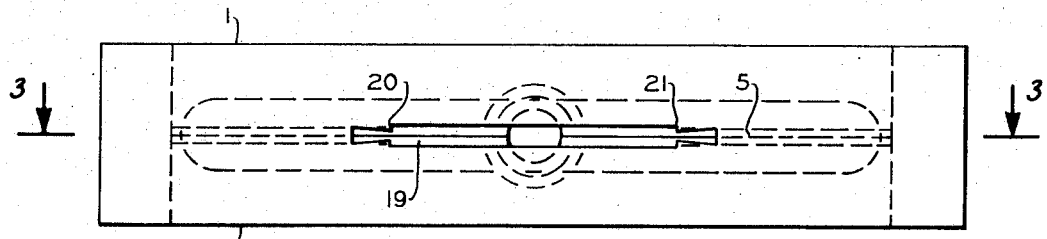
FIG. 4 is a front view of the extruder and deckle bar of FIG. 3.
Figure 5:
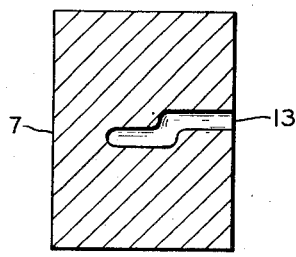
FIGS. 5 through 9 show a front view of end plates which allow expansion of extrudate into a variety of edge configurations.
Figure 6:
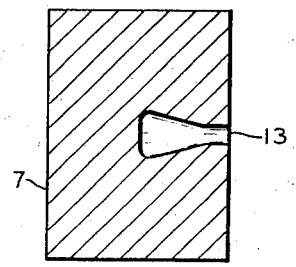
Figure 7:
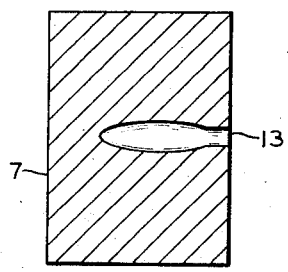
Figure 8:
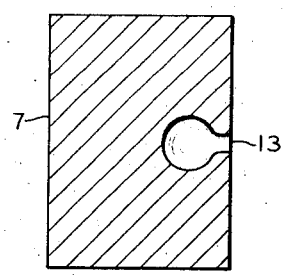
Figure 9:
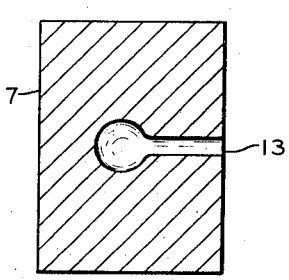

Referring now to FIG. 3 and FIG. 4, it can be seen that the same advantages accruing by the use of a slotted end plate used with a sheet extruder to increase the lateral dimension of usable extruded material is also adaptable for use when it is desired to produce sheet material having a lateral dimension less than the lateral dimension of the extruder die slot. For this purpose, a deckle bar 18 is attached to the extrusion die 1 and 2. The deckle bar has a slotted opening 19 which aligns with the slotted opening 5 of the extrusion die and delineates an extrusion opening of lesser lateral dimension than the lateral dimension of the extrusion die slotted opening. The lateral edges 20 and 21 of the deckle bar slotted opening 19 describe slotted extensions 22 and 23 shaped to allow increasing lateral measurement of the extrudate as the extrudate moves through the deckle bar from the extrusion slot out of the die.

In FIGS. 5 through 9 a front view of spacer plates 7 showing various configurations of slotted openings 13 illustrate some of the variety of designs that can be given to the lateral edge of extrudate passing through the spacers. It will be obvious that the same designs could be applied to the slots cut in end plates or in the lateral edges of deckle bar openings.

As has been stated before, the method and apparatus hereinbefore described can be used in extruding sheet material of any thermoplastic material and is especially useful in the extrusion of material that is foamed as it is extruded.

Reasonable variation and modification are possible within the scope of the foregoing disclosure, the drawing, and the appended claims of the invention the essence of which is that there is provided a method and apparatus for controlling the extrudate emerging from a sheet extruder allowing lateral expansion of the extrudate as it is extruded.

I claim:

1. A coat hanger type sheet extrusion die having separable end plates for making the edges of extrudate uniform in thickness, texture, and color, said end plates comprising a slot opening aligned with the extrusion slot of said extrusion die and of dimensions sufficient to allow increasing lateral measurement of the extrudate as said extrudate moves through said plates from the extrusion slot of said die.

2. An extrusion die of claim 1 wherein each of said end plates comprise a slotted spacer plate and an end cap.

3. An extrusion die having separable end plates of claim 1 wherein the slotted opening of each end plate is of a configuration to give the extrudate edge a shape dissimilar to the extrudate sheet issuing from the die lips.

* * * * *